United States Patent
Hoerz et al.

(10) Patent No.: US 11,476,730 B2
(45) Date of Patent: Oct. 18, 2022

(54) ELECTRICAL MACHINE WITH STATOR WITH COOLANT DISTRIBUTOR CHAMBER AND COOLANT COLLECTOR CHAMBER

(71) Applicant: Mahle International GmbH, Stuttgart (DE)

(72) Inventors: Mirko Hoerz, Esslingen (DE); Hans-Ulrich Steurer, Stuttgart (DE); Josef Sonntag, Nuertingen (DE); Stojan Markic, Kojsko (SI); Andrej Licen, Branik (SI); Aleks Medvescek, Rence (SI); Peter Sever, Murska Sobota (SI); Philip Grabherr, Stuttgart (DE)

(73) Assignee: Mahle International GmbH

( * ) Notice: Subject to any disclaimer, the term of this patent is extended or adjusted under 35 U.S.C. 154(b) by 171 days.

(21) Appl. No.: 16/614,798

(22) PCT Filed: May 18, 2018

(86) PCT No.: PCT/EP2018/063143
§ 371 (c)(1),
(2) Date: Nov. 18, 2019

(87) PCT Pub. No.: WO2018/211089
PCT Pub. Date: Nov. 22, 2018

(65) Prior Publication Data
US 2020/0204024 A1    Jun. 25, 2020

(30) Foreign Application Priority Data
May 19, 2017    (DE) .......................... 102017208566.5

(51) Int. Cl.
*H02K 3/24*    (2006.01)
*H02K 1/20*    (2006.01)
(Continued)

(52) U.S. Cl.
CPC ................. *H02K 3/24* (2013.01); *H02K 1/16* (2013.01); *H02K 1/20* (2013.01); *H02K 9/197* (2013.01)

(58) Field of Classification Search
CPC .. H02K 1/20; H02K 1/16; H02K 3/24; H02K 9/005; H02K 9/197; H02K 9/00
See application file for complete search history.

(56) References Cited

U.S. PATENT DOCUMENTS 2,390,130 A * 12/1945 Sigmund .................. H02K 3/44
                                                310/54
3,960,803 A    6/1976 Smith et al.
(Continued)

FOREIGN PATENT DOCUMENTS

CN    201393142 Y    1/2010
CN    102780289 A    11/2012
(Continued)

OTHER PUBLICATIONS

Triller (DE 102008061450 A1) English Translation (Year: 2010).*
(Continued)

*Primary Examiner* — Tulsidas C Patel
*Assistant Examiner* — Robert E Mates
(74) *Attorney, Agent, or Firm* — Fishman Stewart PLLC

(57) ABSTRACT

An electric machine, for example for a motor vehicle, is disclosed. The electric machine includes a rotor rotatable about an axis of rotation that defines an axial direction of the electric machine, and a stator including stator windings. A coolant distributor chamber and a coolant collector chamber are provided, and arranged with an axial spacing to one another. The coolant distributor chamber fluidically communicates with the coolant collector chamber for cooling the stator windings via at least one cooling channel that can be flowed through by a coolant. At least one of the stator
(Continued)

windings is embedded into a plastics compound composed of an electrically insulating plastic for thermal coupling.

40 Claims, 6 Drawing Sheets

(51) Int. Cl.
*H02K 9/197* (2006.01)
*H02K 1/16* (2006.01)

(56) References Cited

U.S. PATENT DOCUMENTS

| | | | |
|---|---|---|---|
| 5,065,064 A | 11/1991 | Kaminski | |
| 5,214,325 A | 5/1993 | Matson et al. | |
| 6,160,332 A | 12/2000 | Tsuruhara | |
| 7,705,495 B2 | 4/2010 | Alfermann et al. | |
| 9,653,955 B2 | 5/2017 | Gundtoft et al. | |
| 2003/0098630 A1* | 5/2003 | Owada | H02K 3/522 310/194 |
| 2008/0042498 A1 | 2/2008 | Beer | |
| 2009/0230806 A1* | 9/2009 | Miyata | H02K 19/22 310/195 |
| 2011/0033321 A1* | 2/2011 | Mikkelsen | H02K 5/15 417/410.1 |
| 2011/0101700 A1* | 5/2011 | Stiesdal | H02K 1/148 290/55 |
| 2012/0001503 A1 | 1/2012 | Owng et al. | |
| 2013/0209239 A1* | 8/2013 | Karlsson | H02K 5/20 415/117 |
| 2014/0265662 A1 | 9/2014 | Shoykhet | |
| 2016/0047395 A1* | 2/2016 | Zhang | H02K 9/06 417/423.14 |
| 2016/0181882 A1* | 6/2016 | Iwaki | H02K 3/345 310/215 |
| 2016/0359396 A1* | 12/2016 | Lambert | H02K 15/125 |

FOREIGN PATENT DOCUMENTS

| | | | | |
|---|---|---|---|---|
| CN | 203352307 U | 12/2013 | | |
| DE | 69105041 T2 | 4/1995 | | |
| DE | 102006029803 A1 | 1/2008 | | |
| DE | 102007054364 A1 | 5/2008 | | |
| DE | 102008061450 A1 * | 6/2010 | ............ | H02K 9/197 |
| DE | 102013223059 A1 | 5/2015 | | |
| DE | 102013226851 A1 | 6/2015 | | |
| FR | 2788385 A1 | 7/2000 | | |
| JP | S50-35284 A | 4/1975 | | |
| JP | S57-7875 U | 1/1982 | | |
| JP | H05-39178 U | 5/1993 | | |
| JP | 2002-335648 A | 11/2002 | | |
| JP | 2003-70199 A | 3/2003 | | |
| JP | 2003070199 A * | 3/2003 | | |
| JP | 2004297924 A | 10/2004 | | |
| JP | 2005354821 A | 12/2005 | | |
| JP | 2011-234433 A | 11/2011 | | |
| JP | 2015-33226 A | 2/2015 | | |
| JP | 2016-226277 A | 12/2016 | | |
| WO | WO 9200627 A * | 9/1992 | | |
| WO | WO-2005004309 A1 | 1/2005 | | |

OTHER PUBLICATIONS

Nakamura (WO 9200627 A) English Translation (Year: 1992).*
Taneda (JP 2003070199 A) English Translation (Year: 2003).*
Japanese Office Action dated Feb. 2, 2021 related to corresponding Japanese Patent Application No. JP 2019-563859.
English abstract for JP-2005354821.
English abstract for DE-102013223059.
English abstract for DE-102013226851.
English abstract for DE-102006029803.
Chinese Office Action dated Dec. 17, 2021 related to corresponding Chinese Patent Application No. 201880048049.0, with English translation.

* cited by examiner

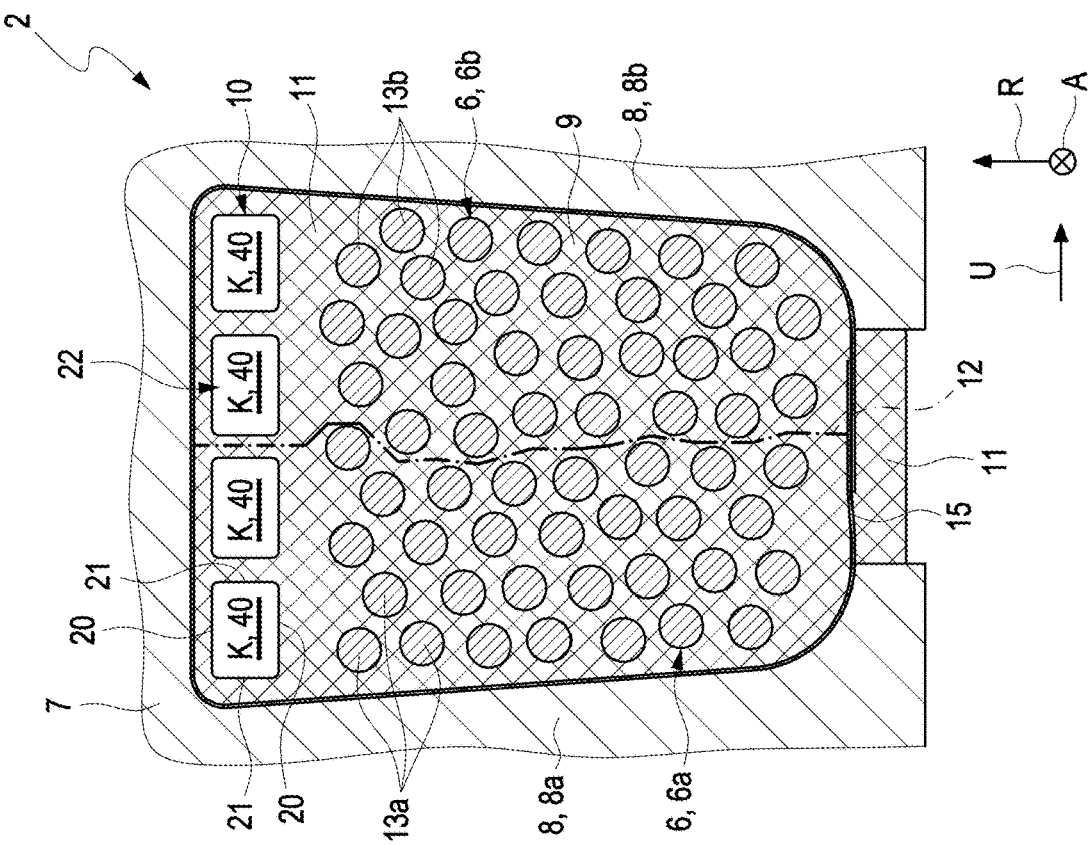
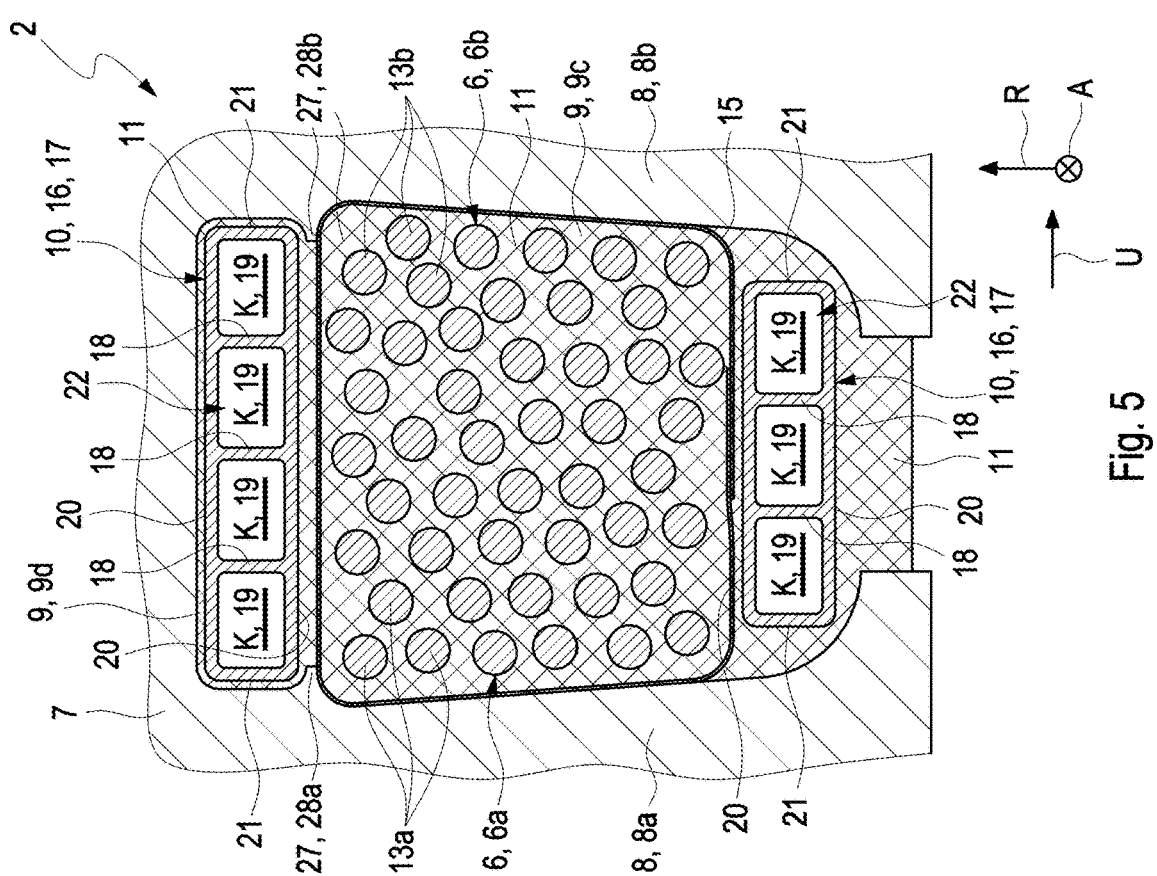

ELECTRICAL MACHINE WITH STATOR WITH COOLANT DISTRIBUTOR CHAMBER AND COOLANT COLLECTOR CHAMBER

CROSS-REFERENCE TO RELATED APPLICATIONS

This application claims priority to International Patent Application No. PCT/EP2018/063143 filed on May 18, 2018, and to German Patent Application DE 10 2017 208 566.5 filed on May 19, 2017, the contents of each of which are hereby incorporated by reference it their entirety.

TECHNICAL FIELD

The invention relates to an electric machine, in particular for a vehicle, and to a vehicle having a machine of said type.

An electric machine of said type may generally be an electric motor or a generator. The electric machine may be designed as an external-rotor machine or as an internal-rotor machine.

BACKGROUND

A generic machine is known for example from U.S. Pat. No. 5,214,325. It comprises a housing which surrounds an interior space, said housing having a shell which runs in encircling fashion in a circumferential direction of the housing and which radially delimits the interior space, having, axially on one side, a rear side wall which axially delimits the interior space, and having, axially on the other side, a front side wall which axially delimits the interior space. A stator of the machine is fixedly connected to the shell. A rotor of the machine is arranged in the stator, wherein a rotor shaft of the rotor is mounted rotatably on the front side wall by means of a front shaft bearing.

The stator of a conventional electric machine typically comprises stator windings which are electrically energized during the operation of the machine. Here, heat is generated which must be dissipated in order to prevent overheating and associated damage to or even destruction of the stator. For this purpose, it is known from conventional electric machines for these to be equipped with a cooling device for cooling the stator—in particular said stator windings. A cooling device of said type comprises one or more cooling channels which are flowed through by a coolant and which are arranged in the vicinity of the stator windings in the stator. Heat can be dissipated from the stator by heat transfer from the stator windings to the coolant.

It has proven to be disadvantageous here that efficient heat transfer from the stator to the coolant flowing through the respective cooling channel is associated only with considerable outlay in terms of construction. This however has an adverse effect on the production costs of the electric machine.

SUMMARY

It is therefore an object of the present invention to create an improved embodiment for an electric machine in the case of which this disadvantage is substantially or even entirely eliminated. In particular, it is sought to create an improved embodiment for an electric machine which is distinguished by improved cooling of the stator windings of the stator.

Said object is achieved by means of the subject matter of the independent patent claims. Preferred embodiments are the subject matter of the dependent patent claims.

It is accordingly the underlying concept of the invention to embed the stator windings of an electric machine into a plastics compound composed of a plastic in which a coolant distributor chamber and a coolant collector chamber for a coolant are also provided, which coolant absorbs, by thermal interaction, the waste heat generated by the stator windings. Here, the plastic is utilized as a heat-transferring medium for the transfer of heat from the stator windings to the coolant.

Particularly good heat transfer between the stator windings and the coolant conducted through the stator is produced in this way. This applies in particular if a plastic is used which exhibits high thermal conductivity. Particularly suitable for this purpose are so-called thermosetting plastics. Since a plastic typically also has the characteristics of an electrical insulator, it is at the same time ensured that the stator windings that are to be cooled are not undesirably electrically short-circuited by the plastic. Thus, even in the case of large amounts of waste heat being generated in the stator, such as arises for example during high-load operation of the electric machine, it can be ensured that the waste heat generated can be dissipated from the stator. Damage to or even destruction of the electric machine as a result of overheating of the stator can thus be prevented. The production of the plastics compound that is essential to the invention with the coolant distributor chamber and/or coolant collector chamber formed therein can be performed by means of injection molding, in the case of which the stator windings that are to be cooled are overmolded with the plastic. The embedding of the stator windings and of the cooling channel into the plastics compound is therefore realized in a very straightforward manner.

For the purposes of cooling the stator windings, the coolant can, proceeding from the coolant collector chamber formed in the plastics compound, be distributed between multiple cooling channels, in which the coolant absorbs waste heat from the stator windings by thermal interaction. After flowing through the cooling channels, the coolant can be collected in the coolant collector chamber. Since the coolant distributor chamber and the coolant collector chamber are, according to the invention, arranged in the plastics compound, the coolant present in the coolant distributor chamber can be used for cooling the stator winding already before being distributed to the cooling channels. This correspondingly applies to the coolant that has been collected in the coolant collector chamber after flowing through the cooling channels. Improved cooling of the stator windings is achieved as a result. Since the coolant distributor chamber or coolant collector chamber is thus arranged directly adjacent to the stator windings that are to be cooled, effective thermal coupling of the coolant distributor chamber or coolant collector chamber to the stator windings that are to be cooled is achieved in this way.

An electric machine according to the invention, in particular for a vehicle, comprises a rotor which is rotatable about an axis of rotation. The axis of rotation defines an axial direction of the electric machine. The machine furthermore comprises a stator which has multiple stator windings. The machine furthermore comprises a coolant distributor chamber and a coolant collector chamber which is arranged with an axial spacing to said coolant distributor chamber. The coolant distributor chamber can, for the purposes of cooling the waste heat generated by the stator winding, be flowed through by a coolant, and fluidically communicates with the coolant collector chamber via at least one cooling channel. It is preferable for at least two, particularly preferably a multiplicity of, such cooling channels to be provided. At least one stator winding is, for the purposes of thermal coupling to the coolant, embedded at least in certain portions, preferably entirely, into a plastics compound composed of an electrically insulating plastic. Here, the coolant distributor chamber and/or the coolant collector chamber are arranged in the region of a first and/or second axial end portion of at least one stator winding. The coolant distributor chamber and/or the coolant collector chamber are preferably arranged in an axial elongation of the first and/or second end portion. According to the invention, the coolant distributor chamber and/or the coolant collector chamber are, for the purposes of thermal coupling to the at least one stator winding, at least partially formed in, and thus at least partially delimited by, the plastics compound.

In a preferred embodiment, the coolant distributor chamber and/or the coolant collector chamber surrounds the first and/or second axial end portion respectively of the at least one stator winding in U-shaped or C-shaped fashion in a longitudinal section along the axis of rotation.

It is particularly preferable if the coolant distributor chamber and/or the coolant collector chamber has a U-shaped or C-shaped geometrical shape in the longitudinal section along the axial direction.

In one advantageous refinement, the coolant distributor chamber and/or the coolant collector chamber are arranged radially at the outside and radially at the inside at the first and/or second end portion respectively of the at least one stator winding.

It is expediently possible for the coolant distributor chamber and/or the coolant collector chamber to have a ring-shaped geometrical shape in a cross section perpendicular to the axis of rotation of the rotor. This permits the arrangement of a multiplicity of cooling channels spaced apart from one another along the circumferential direction along the stator.

It is particularly preferable if the at least one plastics compound at least partially delimits the coolant distributor chamber and/or the coolant collector chamber. The provision of a separate housing can thus be omitted.

In a further preferred embodiment, the coolant distributor chamber and/or the coolant collector chamber are formed by a cavity which is provided at least partially, preferably entirely, in the plastics compound. The provision of a separate encapsulation or of a housing for delimiting the coolant distributor chamber or coolant collector chamber can thus be omitted. This is associated with not inconsiderable cost advantages.

In a preferred embodiment, the at least one cooling channel is also embedded into the at least one plastics compound composed of the electrically insulating plastic. This ensures good thermal coupling of the coolant flowing through the cooling channel to the respective stator windings.

In another preferred embodiment, the stator has stator teeth which extend along the axial direction and which are arranged spaced apart from one another along a circumferential direction and which bear the stator windings. In this embodiment, the plastics compound with the at least one cooling channel and with the at least one stator winding is arranged in an intermediate space which is formed between two stator teeth which are adjacent in the circumferential direction. This measure ensures particularly good heat transfer between the stator windings and the cooling channel, because the cooling channel is arranged in the intermediate space in the immediate vicinity of the stator windings that are to be cooled. Furthermore, said intermediate space between the stator teeth can, during the production of the plastics compound, be used in the manner of a casting mold into which the plastic of the plastics compound is injected.

This simplifies the production of the plastics compound, because the provision of a separate casting mold can be omitted.

A further preferred embodiment proposes that the intermediate space be divided into a first and a second partial space. In this embodiment, the at least one stator winding is arranged in the first partial space. The at least one cooling channel is arranged in the second partial space. Formed between the two partial spaces is a positioning aid by means of which the at least one cooling channel can be positioned in the second partial space. This measure permits precise and stable positioning of the cooling channel—which is typically a tubular body or a flat tube—when said cooling channel together with the stator windings is overmolded, in the intermediate space between the two stator teeth, with the plastic that forms the plastics compound.

In an advantageous refinement of this embodiment, the positioning aid comprises two projections which are formed on two stator teeth which are adjacent in the circumferential direction. The two projections face toward one another in the circumferential direction of the rotor and project into the intermediate space for the purposes of positioning the cooling channel. This embodiment permits a particularly accurate orientation of the cooling channel in the intermediate space before the overmolding with the plastic of the plastics compound.

In a preferred embodiment, the plastics compound arranged in the intermediate space is composed of a single plastics material. In this embodiment, an additional electrical insulator composed of an electrically insulating material is arranged in the intermediate space, preferably between the stator winding or plastics compound and the stator tooth. Since, in this embodiment, only a single plastics material has to be introduced into the intermediate spaces, the production of the plastics compound from said plastic can be performed in a single injection molding step. The production of the plastics compound is thus made particularly simple, which is associated with cost advantages.

The electrically insulating plastic of the plastics compound expediently comprises a thermoset or is a thermoset. Alternatively, the electrically insulating plastic of the plastics compound may comprise a thermoplastic or be a thermoplastic. A combination of a thermoset and a thermoplastic is also conceivable in a further variant.

The plastics compound expediently substantially completely fills the intermediate space. In this way, the formation of undesired intermediate spaces, for example in the manner of air gaps, which would lead to an undesired reduction of the heat transfer, is avoided.

In a preferred embodiment, the at least one plastics compound projects axially out of the intermediate space, preferably to both sides. The plastics compound can thus be used for forming the coolant distributor chamber and/or coolant collector chamber.

In another preferred embodiment, the at least one cooling channel is arranged radially outside and/or radially within the respective stator winding in the intermediate space. This permits a space-saving arrangement of the cooling channel close to the stator windings that are to be cooled, such that the electric machine requires only little structural space for the cooling of the stator windings.

A preferred embodiment proposes that the at least one cooling channel be formed as a tubular body which surrounds a tubular body interior space. In this variant, on the tubular body, there is formed at least one partition element which divides the tubular body interior space into at least two partial cooling channels which are fluidically separate from one another. The tubular body can be stiffened by means of said partition elements, such that the mechanical strength of said tubular body is increased.

The tubular body may expediently be formed as a flat tube with two wide sides and two narrow sides.

An advantageous refinement proposes that the tubular body be formed as a flat tube which extends along the axial direction and which, in a cross section perpendicular to the axial direction, has two wide sides and two narrow sides. Expediently, in the cross section perpendicular to the axial direction, at least one wide side of the flat tube extends perpendicular to the radial direction. A length of the two wide sides may in this case preferably amount to at least four times, preferably at least ten times, a length of the two narrow sides.

The at least one cooling channel is particularly preferably arranged entirely in the plastics compound composed of the plastic.

In a further preferred embodiment, the stator is of ring-shaped form in a cross section perpendicular to the axial direction and has stator teeth which extend along the axial direction and which are arranged spaced apart from one another along a circumferential direction of the stator and which bear the stator windings. In this embodiment, the plastics compound with the at least one cooling channel and with the at least one stator winding is arranged in an intermediate space which is formed between two stator teeth which are adjacent in the circumferential direction. This measure ensures a particularly effective transfer of heat between the stator windings and the cooling channel, because the cooling channel arranged in the intermediate space is situated in the immediate vicinity of the stator windings that are to be cooled. Furthermore, the intermediate space between the stator teeth can, during the production of the plastics compound, be used in the manner of a casting mold into which the plastic of the plastics compound is injected. This simplifies the production of the plastics compound, because the provision of a separate casting mold can be omitted.

In a further preferred embodiment, the at least one cooling channel is formed by at least one, preferably multiple, aperture(s) which is/are provided in the plastics compound and which can be flowed through by the coolant. It is particularly preferable for multiple such apertures to be provided. The provision of a separate tubular body or the like for delimiting the cooling channel is omitted in this variant. This is associated with reduced production costs. Said aperture may be realized in the form of a passage bore which is formed into the plastics compound by means of a suitable drilling tool. The provision of a separate tubular body or the like for delimiting the cooling channel is omitted in this variant. This is associated with reduced production costs.

At least one aperture may expediently have, in a cross section perpendicular to the axial direction, the geometry of a rectangle with two wide sides and two narrow sides. In this way, the aperture is provided with the advantageous geometry of a flat tube, which in turn permits a structural-space-saving arrangement of the cooling channel in the immediate vicinity of the stator winding(s) to be cooled.

In a further preferred embodiment, at least one cooling channel is arranged in the stator body and is formed by at least one aperture which can be flowed through by the coolant. Said aperture may be realized in the form of a passage bore that is formed into the stator body by means of a suitable drilling tool during the course of the production of the electric machine. The provision of a separate tubular body or the like for delimiting the cooling channel is omitted in this variant. This is associated with reduced production costs.

In a further preferred embodiment, the aperture that forms the cooling channel is formed so as to be open toward the intermediate space. Furthermore, said aperture is closed off in fluid-tight fashion by the plastics compound arranged in the intermediate space. In this variant, the apertures can be produced particularly easily, which is associated with cost advantages in the production process.

The at least one cooling channel is expediently arranged in the stator body in the region between two adjacent stator teeth with respect to the circumferential direction. This makes it possible for the cooling channel to be arranged close to the stator windings that are to be cooled, which improves the heat transfer from the stator windings to the cooling channel.

In another preferred embodiment, at least one cooling channel is arranged in the plastics compound and at least one further cooling channel is arranged in the stator body. This variant requires particularly little structural space, because both the stator body and the plastics compound are utilized for receiving the cooling channel.

In another preferred embodiment, the stator is arranged along the axial direction between a first and a second bearing bracket which are situated opposite one another along the axial direction. In this embodiment, a part of the coolant distributor chamber is arranged in the first bearing bracket. Alternatively or in addition, a part of the coolant collector chamber is arranged in the second bearing bracket.

In another preferred embodiment, a coolant feed line is formed in the first bearing bracket, which coolant feed line fluidically connects the coolant distributor chamber to a coolant inlet that is provided on the outside, preferably at a face side, on the first bearing bracket. Furthermore, a coolant discharge line is formed in the second bearing bracket, which coolant discharge line fluidically connects the coolant collector chamber to a coolant outlet that is provided on the outside, preferably at a face side, on the second bearing bracket. The coolant feed line may particularly preferably be thermally connected to a first shaft bearing, which is provided in the first bearing bracket, for the rotatable mounting of the stator. Analogously, the coolant discharge line may be thermally connected to a second shaft bearing, which is provided in the second bearing bracket, for the rotatable mounting of the stator.

The plastics compound is particularly preferably an injection-molded compound composed of an electrically insulating plastic. The use of an injection molding process simplifies and accelerates the production of the plastics compound. This leads to cost advantages in the production of the electric machine.

It is particularly preferable for the entire plastics compound, that is to say in particular the plastics compound arranged in the intermediate spaces between the stator teeth and the plastics compound that delimits the coolant distributor chamber and the coolant collector chamber, to be formed as a single piece. This measure simplifies the production of the electric machine, which is associated with cost advantages.

It is particularly preferable if the coolant distributor chamber and/or the coolant collector chamber axially adjoin the at least one stator winding. Since the coolant distributor chamber or coolant collector chamber is thus, with respect to the axial direction, arranged directly adjacent to the stator windings that are to be cooled, effective thermal coupling of the coolant distributor chamber or coolant collector chamber to the stator windings that are to be cooled is achieved in this way.

In a further preferred embodiment, the coolant collector chamber and/or the coolant distributor chamber adjoins the at least one stator winding, preferably at the first and/or second axial end portion respectively thereof, radially at the outside and/or radially at the inside and axially at the end side.

In one advantageous refinement, the stator comprises a, preferably ring-shaped, stator body, from which the stator teeth project. In this refinement, the plastics compound composed of the electrically insulating plastic is arranged on an outer circumferential side of the stator body and preferably forms a plastics coating on said outer circumferential side. The stator can thus be electrically insulated with respect to the surroundings. The provision of a separate housing for receiving the stator body can thus be omitted. A coating of at least one or both end sides of the stator body with the plastics compound is also conceivable in an optional variant. In a further variant, the plastics compound may encapsulate the stator body, preferably entirely.

In one preferred embodiment, the plastics compound at least partially surrounds at least one winding portion, which projects axially out of the intermediate space of the stator body, of at least one stator winding, and at the same time partially delimits the coolant distributor chamber and/or the coolant collector chamber, such that said winding portion of the stator winding is electrically insulated with respect to the coolant. An undesired electrical short circuit of the coolant with the stator winding during the operation of the electric machine is prevented in this way.

In one advantageous refinement, the coolant distributor chamber fluidically communicates with the coolant collector chamber by means of a multiplicity of cooling channels.

The multiplicity of cooling channels expediently extend, in each case spaced apart from one another, along the axial direction. This measure ensures that all axial portions of the stator windings are cooled.

The cooling channels are preferably arranged spaced apart from one another along a circumferential direction of the stator. This measure ensures that all stator windings are cooled along the circumferential direction.

In another preferred embodiment, the coolant distributor chamber and/or coolant collector chamber is arranged adjacent to the stator body exclusively in an axial elongation of said stator body. Preferably, in this embodiment, the coolant distributor chamber and/or the coolant collector chamber does not project beyond the stator body or stator along a radial direction of said stator body or stator. This embodiment requires only very little structural space in a radial direction.

It is particularly preferable for at least one stator winding to be formed so as to be electrically insulated with respect to the coolant and with respect to the stator body at least in the region within the respective intermediate space during the operation of the electric machine. This particularly preferably applies to all stator windings of the electric machine. An undesired electrical short circuit of the stator winding with the stator body—during the operation of the electric machine—with the coolant is prevented in this way.

Said electrical insulation of the at least one stator winding with respect to the stator body, preferably also with respect to the stator teeth that delimit the intermediate space, is particularly expediently formed entirely by the plastics compound and/or by the additional electrical insulator already mentioned above. The provision of a further electrical insulator can be omitted in this way.

In another preferred embodiment, the additional electrical insulator extends within the intermediate space over the entire length, measured along the axial direction, of the intermediate space, such that said additional electrical insulator insulates the stator winding with respect to the stator body and with respect to the stator teeth that delimit the intermediate space.

In one advantageous refinement, the additional electrical insulator surrounds the stator winding within the intermediate space over at least the entire length of the intermediate space along the circumference thereof.

In a particularly preferred embodiment, the at least one stator winding is also electrically insulated with respect to the cooling channel formed as a tubular body. Here, the electrical insulation is formed by the plastics compound and/or the additional insulator.

The stator windings may particularly preferably be part of a distributed winding.

The invention furthermore relates to a vehicle, in particular a motor vehicle, having an electric machine as proposed above. The advantages of the electric machine as discussed above are therefore also transferable to the vehicle according to the invention.

Further important features and advantages of the invention will emerge from the subclaims, from the drawings and from the associated figure description based on the drawings.

It is self-evident that the features mentioned above and the features yet to be discussed below may be used not only in the respectively specified combination but also in other combinations or individually without departing from the scope of the present invention.

Preferred exemplary embodiments of the invention are illustrated in the drawings and will be discussed in more detail in the following description.

BRIEF DESCRIPTION OF THE DRAWINGS

In the drawings, in each case schematically:

FIGS. 5-9 show further different design variants for the intermediate space, filled with plastics compound, between two stator teeth.

DETAILED DESCRIPTION

Figure 1:
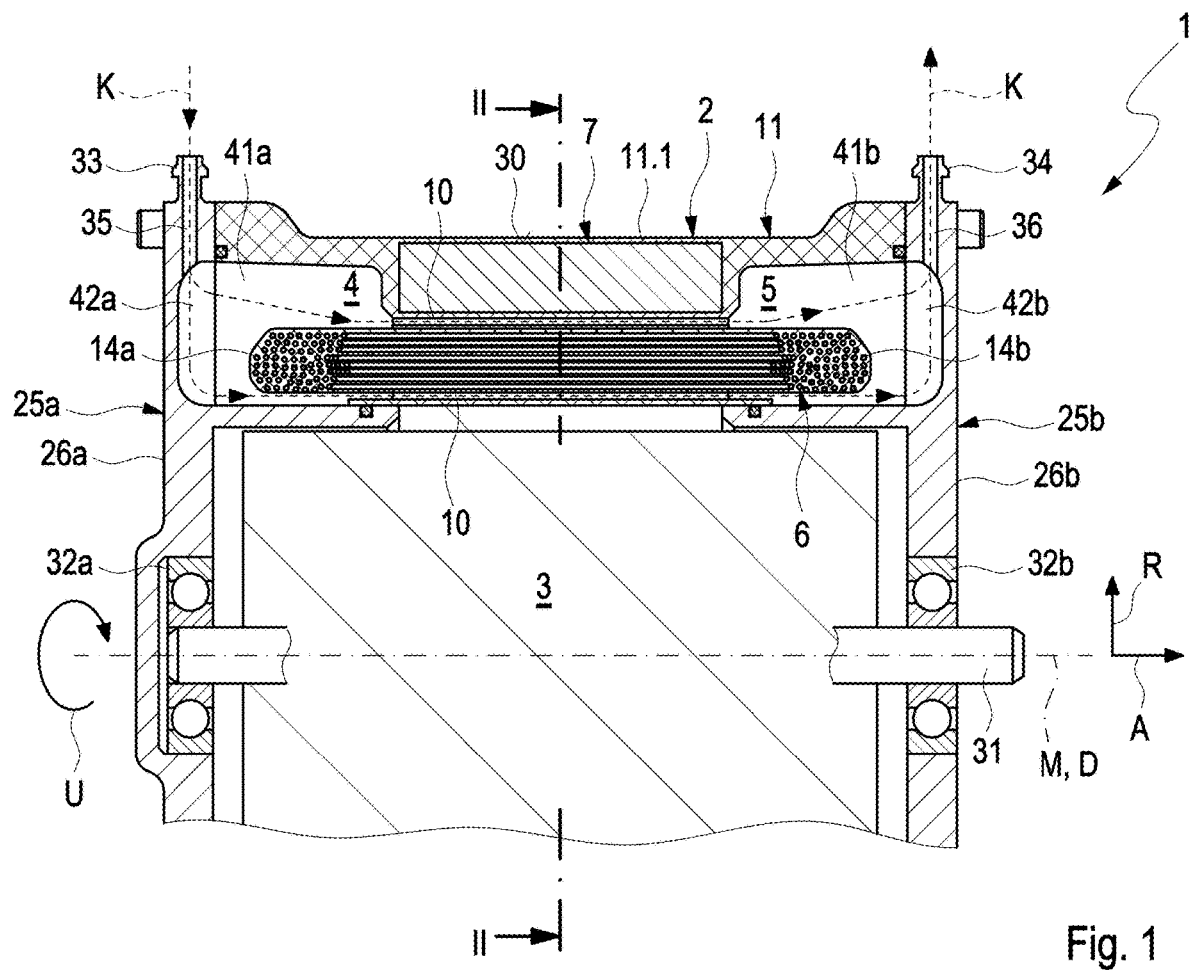
FIG. 1 shows an example of an electric machine according to the invention in a longitudinal section along the axis of rotation of the rotor.

FIG. 1 illustrates an example of an electric machine 1 according to the invention in a sectional illustration. The electric machine 1 is dimensioned such that it can be used in a vehicle, preferably in a road-going vehicle.

The electric machine 1 comprises a rotor 3, which is illustrated only in highly schematic form in FIG. 1, and a stator 2. For illustrative purposes, the stator 2 is illustrated in a separate illustration in FIG. 2 in a cross section perpendicular to the axis of rotation D along the section line II-II in FIG. 1. Correspondingly to FIG. 1, the rotor 3 has a rotor shaft 31 and may have multiple magnets (not illustrated in any more detail in FIG. 1), the magnetic polarization of which alternates along the circumferential direction U. The rotor 3 is rotatable about an axis of rotation D, the position of which is defined by the central longitudinal axis M of the rotor shaft 31. The axis of rotation D defines an axial direction A which extends parallel to the axis of rotation D. A radial direction R is perpendicular to the axial direction A. A circumferential direction U rotates around the axis of rotation D.

As can be seen in FIG. 1, the rotor 3 is arranged in the stator 2. The electric machine 1 shown here is thus a so-called internal-rotor machine. An implementation as a so-called external-rotor machine, in the case of which the rotor 3 is arranged outside the stator 2, is however also conceivable. The rotor shaft 31 is mounted on the stator 2, so as to be rotatable about the axis of rotation D, in a first shaft bearing 32a and, axially spaced apart from the latter, in a second shaft bearing 32b.

The stator 2 furthermore comprises, in a known manner, multiple stator windings 6 which can be electrically energized for the purposes of generating a magnetic field. The rotor 3 is set in rotation by magnetic interaction of the magnetic field generated by the magnets of the rotor 3 with the magnetic field generated by the stator windings 6.

Figure 2:
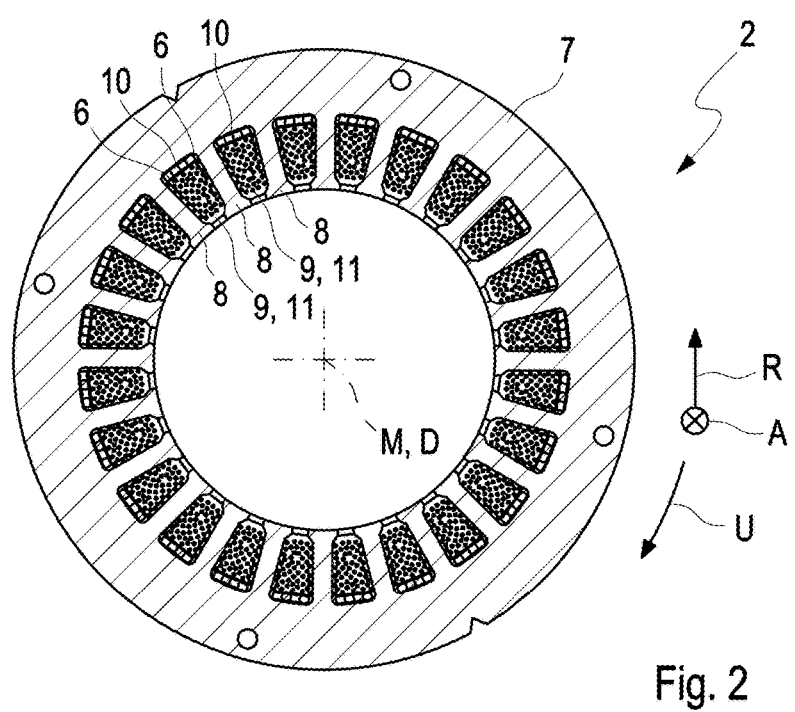
FIG. 2 shows the stator of the electric machine as per FIG. 1 in a cross section perpendicular to the axis of rotation of the rotor.

It can be seen from the cross section in FIG. 2 that the stator 2 may have a ring-shaped stator body 7, composed for example of iron. In particular, the stator body 7 may be formed from multiple stator body laminations (not shown) which are stacked one on top of the other and adhesively bonded to one another along the axial direction A. Radially at the inside on the stator body 7, there are integrally formed multiple stator teeth 8, which extend along the axial direction A, project radially inward away from the stator body 7 and are arranged spaced apart from one another along the circumferential direction U. Each stator tooth 8 bears a stator winding 6. The individual stator windings 6 together form a winding arrangement. Depending on the number of magnetic poles to be formed by the stator windings 6, the individual stator windings 6 of the entire winding arrangement may be correspondingly electrically wired together.

During the operation of the machine 1, the electrically energized stator windings 6 generate waste heat, which must be discharged from the machine 1 in order to prevent overheating and associated damage to or even destruction of the machine 1. The stator windings 6 are therefore cooled by means of a coolant K, which is conducted through the stator 2 and which, by heat transfer, absorbs the waste heat generated by the stator windings 6.

In order to conduct the coolant K through the stator 2, the machine 1 comprises a coolant distributor chamber 4, in which a coolant K can be introduced via a coolant inlet 33. A coolant collector chamber 5 is arranged spaced apart from the coolant distributor chamber 4 along the axial direction A. The coolant distributor chamber 4 fluidically communicates with the coolant collector chamber 5 by means of multiple cooling channels 10, of which only a single one can be seen in the illustration of FIG. 1. In a cross section, not shown in the figures, perpendicular to the axial direction A, the coolant distributor chamber 4 and the coolant collector chamber 5 may each have a ring-shaped geometry. Multiple cooling channels 10 are arranged spaced apart from one another along the circumferential direction U, which cooling channels extend in each case along the axial direction A from the ring-shaped coolant distributor chamber 4 to the ring-shaped coolant collector chamber 5. The coolant K that is introduced via the coolant inlet 33 into the coolant distributor chamber 4 can thus be distributed to the individual cooling channels 10. After flowing through the cooling channels 10 and absorbing heat from the stator windings, the coolant K is collected in the coolant collector chamber 5 and is discharged from the machine 1 again via a coolant outlet 34 provided on the stator 2.

As can be seen from the illustration in FIGS. 1 and 2, the stator windings 6 are arranged in intermediate spaces 9 which are formed between in each case two stator teeth 8 which are adjacent in the circumferential direction U. Said intermediate spaces 9 are also known to a person of relevant skill in the art as so-called "stator grooves" or "stator slots", which, like the stator teeth 8, extend along the axial direction A.

Figure 3:
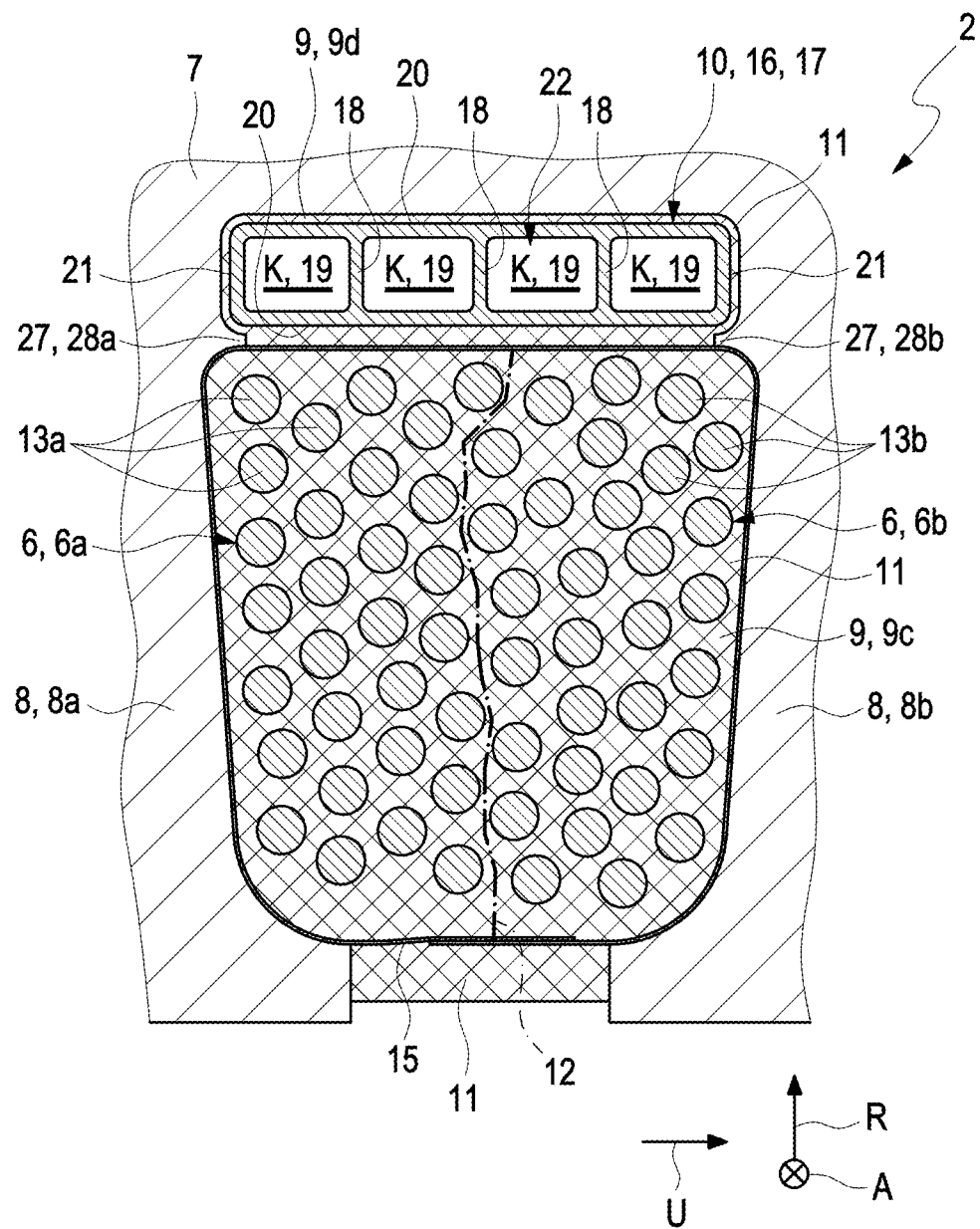
FIG. 3 shows a detail of the stator of FIG. 2 in the region of an intermediate space between two stator teeth which are adjacent in a circumferential direction.

Attention shall now be directed to the illustration of FIG. 3, which shows, in a detail illustration, an intermediate space 9 formed between two stator teeth 8—hereinafter also referred to as stator teeth 8a, 8b—which are adjacent in the circumferential direction U. To improve the heat transfer of the waste heat generated by the stator windings 6 to the coolant K flowing through the cooling channels 10, a plastics compound 11 composed of an electrically insulating plastic is provided in each case in the intermediate spaces 9, correspondingly to FIG. 3. The plastics compound 11 is particularly preferably an injection-molded compound composed of an electrically insulating plastic. The use of an injection molding process simplifies and accelerates the production of the plastics compound. In the example of FIG. 3, the plastics compound 11 is composed of a single plastics material. The cooling channel 10 arranged in the intermediate space 9, and the stator winding 6 arranged in the same intermediate space 9, are embedded into the plastics compound 11, which may be composed for example of a thermoset or of a thermoplastic. It is self-evident that the stator winding 6 which is arranged, as per FIG. 3, in the intermediate space 9 belongs in each case partially to a first stator winding 6a, which is borne by a first stator tooth 8a, and is partially assigned to a second stator winding 6b, which is borne by a second stator tooth 8b which is adjacent to the first stator tooth 8a in the circumferential direction U. To illustrate this scenario, a virtual parting line 12 is shown in FIG. 3. The winding wires 13a shown to the left of the parting line 12 in FIG. 3 belong to the stator winding 6a borne by the stator tooth 8a. The winding wires 13b shown to the right of the parting line 12 belong to the stator winding 6b borne by the stator tooth 8b.

It can also be seen from the detail illustration of FIG. 3 that an additional electrical insulator 15 composed of an electrically insulating material is arranged in the respective intermediate space 9 between the plastics compound 11 and the stator body 7 or the two stator teeth 8a, 8b that delimit the intermediate space 9 in the circumferential direction U. An electrical insulator 15 composed of paper has proven to be particularly inexpensive. In this way, in the event of the plastics compound 11 rupturing owing to thermal overloading or being damaged in some other way, an undesired electrical short circuit of the stator winding 6 with the material of the stator body 7 or of the stator teeth 8 or 8a, 8b—typically iron or some other suitable electrically conductive material—can be prevented.

As shown by the detail illustration of FIG. 3, the cooling channels 10 may each be formed by a tubular body 16, composed for example of aluminum, which surrounds a tubular body interior space 22. Optionally, as shown in the detail illustration of FIG. 3, one or more partition elements 18 may be formed on the tubular body 16, which partition element(s) divide(s) the cooling channel 10 into partial cooling channels 19 which are fluidically separate from one another. In this way, the flow characteristics of the coolant K in the cooling channel 10 can be improved, which is associated with improved heat transfer to the coolant K. Furthermore, the tubular body 16 is additionally mechanically stiffened in this way. By way of example, FIG. 3 illustrates three such partition elements 18, such that four partial cooling channels 19 are formed. A different number of partition elements 18 is self-evidently possible in variants of the example. The tubular body 16 that forms the cooling channel 10 is formed as a flat tube 17 which, in a cross section perpendicular to the axis of rotation D of the rotor 3 (see FIG. 3), has two wide sides 20 and two narrow sides 21. In the cross section perpendicular to the axial direction A as shown in FIG. 3 the two wide sides 20 of the flat tube 17 extend perpendicular to the radial direction R. A length of the two wide sides 20 amounts to at least four times, preferably at least 10 times, a length of the two narrow sides 21.

In the example of FIGS. 1 to 3, the cooling channels 10 are arranged radially outside the stator windings 6 in the respective intermediate space 9. The radial spacing of the cooling channels 10 to the axis of rotation D of the rotor 3 is thus greater than that of the stator windings 6 to the axis of rotation D. An arrangement of the cooling channels 10 radially at the inside is however also conceivable.

In FIG. 3, the intermediate space 9 comprises a first partial space 9c, in which the stator winding 6 is arranged, and a second partial space 9d, in which the cooling channel 10 is arranged and which supplements the first partial space 9c to form the intermediate space 9. As can be seen from FIGS. 3 and 4, a positioning device 27 may be arranged between the two partial spaces, by means of which positioning device the cooling channel 10 is positioned in the second partial space 9d. Said positioning device 27 comprises two projections 28a, 28b, which are formed on the two stator teeth 8a, 8b which are adjacent in the circumferential direction U and which delimit the intermediate space 9. The two projections 28a, 28b face toward one another in the circumferential direction U and project into the intermediate space for the purposes of positioning the cooling channel. The projections 28a, 28b act as a radial stop for the cooling channel 10 formed as a tubular body 16 or flat tube 17, which radial stop prevents an undesired movement of the cooling channel 10 in a radially inward direction, in particular during the production of the plastics compound 11 by means of injection molding.

As per FIG. 1, the plastics compound 11 composed of the electrically insulating plastic may also be arranged on an outer circumferential side 30 of the stator body 7 and form a plastics coating 11.1 on the outer circumferential side 30. The stator body 7, which is typically formed from electrically conductive stator plates, of the stator 2 can thus be electrically insulated with respect to the surroundings. The provision of a separate housing for receiving the stator body 7 can thus be omitted.

For the production of an electric machine 1 as per FIGS. 1 to 3, it is firstly the case that the cooling channels 10 formed by tubular bodies 16 or flat tubes 17 are introduced into the intermediate spaces 9. Subsequently, the electrical insulator 15, composed for example of paper, is inserted into the intermediate spaces 9. The stator windings 6 are subsequently arranged on the stator teeth 8 and thus also introduced into the intermediate spaces 9 and subsequently overmolded with the plastic, for example a thermoset, that forms the plastics compound 11. During the course of the production of the plastics compound 11, the stator body 7 may also be overmolded with the plastic that forms the plastics compound 11, that is to say in particular with the thermoset. Likewise, the coolant distributor 4 and the coolant collector 5 are produced during the course of the injection molding process.

Below, reference will be made again to FIG. 1. In the longitudinal section along the axis of rotation D as illustrated in FIG. 1, the coolant distributor chamber 4 surrounds the first axial end portion 14a of the respective stator winding 6 in U-shaped or C-shaped fashion, that is to say along the direct axial elongation thereof and radially to the inside and radially to the outside. Correspondingly, in the longitudinal section along the axis of rotation D, the coolant collector chamber 5 surrounds the second axial end portion 14b of the respective stator winding 6 in U-shaped or C-shaped fashion, that is to say along the axial elongation thereof and radially to the inside and radially to the outside. The coolant distributor chamber 4 and the coolant collector chamber 5 thus have a U-shaped or C-shaped geometrical shape in the longitudinal section along the axial direction A.

In this variant, cooling channels 10 are provided both radially within and radially outside the stator winding 6. The respective stator windings 6 including the axial end portions 14a, 14b thereof are thus in thermal contact with the coolant K via the cooling channels 10 and via the coolant distributor chamber 4 and the coolant collector chamber 5. This permits effective cooling of the stator windings 6 including the axial end portions 14a, 14b thereof, which are subjected to particularly high thermal loading during the operation of the machine 1. In a simplified variant, it is possible to omit the cooling channels 10 arranged radially within the stator winding 6. In a further simplified variant, it is possible to omit the cooling channels 10 arranged radially outside the stator winding 6.

As is shown by way of illustration in FIG. 1, the plastics compound 11 formed as a single piece may project out of the intermediate spaces 9 axially to both sides. This makes it possible for the coolant distributor chamber 4 and alternatively or additionally the coolant collector chamber 5 to also be embedded into the plastics compound 11 for the purposes of thermal coupling to axial end portions 14a, 14b of the respective stator winding 6 that are arranged axially outside the respective intermediate space 9. In other words, in this design variant, the one plastics compound 11 delimits the coolant distributor chamber 4 and the coolant collector chamber 5 in each case at least partially.

In this way, effective heat transfer to the coolant K that is present in the coolant distributor chamber 4 and coolant collector chamber 5 respectively can be realized even in the region of the axial end portions 14a, 14b, which are commonly subjected to particularly high thermal load, of the respective stator winding 6. This measure permits particularly effective cooling of the two axial end portions 14a, 14b of the stator winding 6.

Furthermore, as per FIG. 1, the stator 2 with the stator body 7 and the stator teeth 8 is arranged axially between a first and a second bearing bracket 25a, 25b. As can be seen from FIG. 1, a part of the coolant distributor chamber 4 is arranged in the first bearing bracket 25a and a part of the coolant collector chamber 5 is arranged in a second bearing bracket 25b. The coolant distributor chamber 4 is thus delimited both by the first bearing bracket 25a and by the plastics compound 11. Correspondingly, the coolant collector chamber 5 is delimited both by the second bearing bracket 25b and by the plastics compound 11.

The coolant distributor chamber 4 and the coolant collector chamber 5 are formed in each case partially by a cavity 41a, 41b provided in the plastics compound 11. The first cavity 41a is supplemented by a cavity 42a, which is formed in the first bearing bracket 25a, to form the coolant distributor chamber 4. Correspondingly, the second cavity 41b is supplemented by a cavity 42b, which is formed in the second bearing bracket 25b, to form the coolant collector chamber 5.

In the first bearing bracket 25a, there may furthermore be formed a coolant feed line 35, which fluidically connects the coolant distributor chamber 4 to a coolant inlet 33 which is provided at the outside, in particular on a circumference as illustrated in FIG. 1, on the first bearing bracket 25a. In the second bearing bracket 25b, there may correspondingly be formed a coolant discharge line 36 which fluidically connects the coolant collector chamber 5 to a coolant outlet 34 which is provided at the outside, in particular on a circumference as illustrated in FIG. 1, on the bearing bracket 25b. This permits an arrangement of the coolant distributor chamber 4 and of the coolant collector chamber 5 respectively radially at the outside at the first and second end portion 14a, 14b respectively of the respective stator winding 6 and also in the elongation of said end portions 14a, 14b along the axial direction A. The end portions 14a, 14b which are subjected to particularly high thermal loading during the operation of the machine 1, of the stator windings 6 can be cooled in a particularly effective manner in this way.

Figure 4:
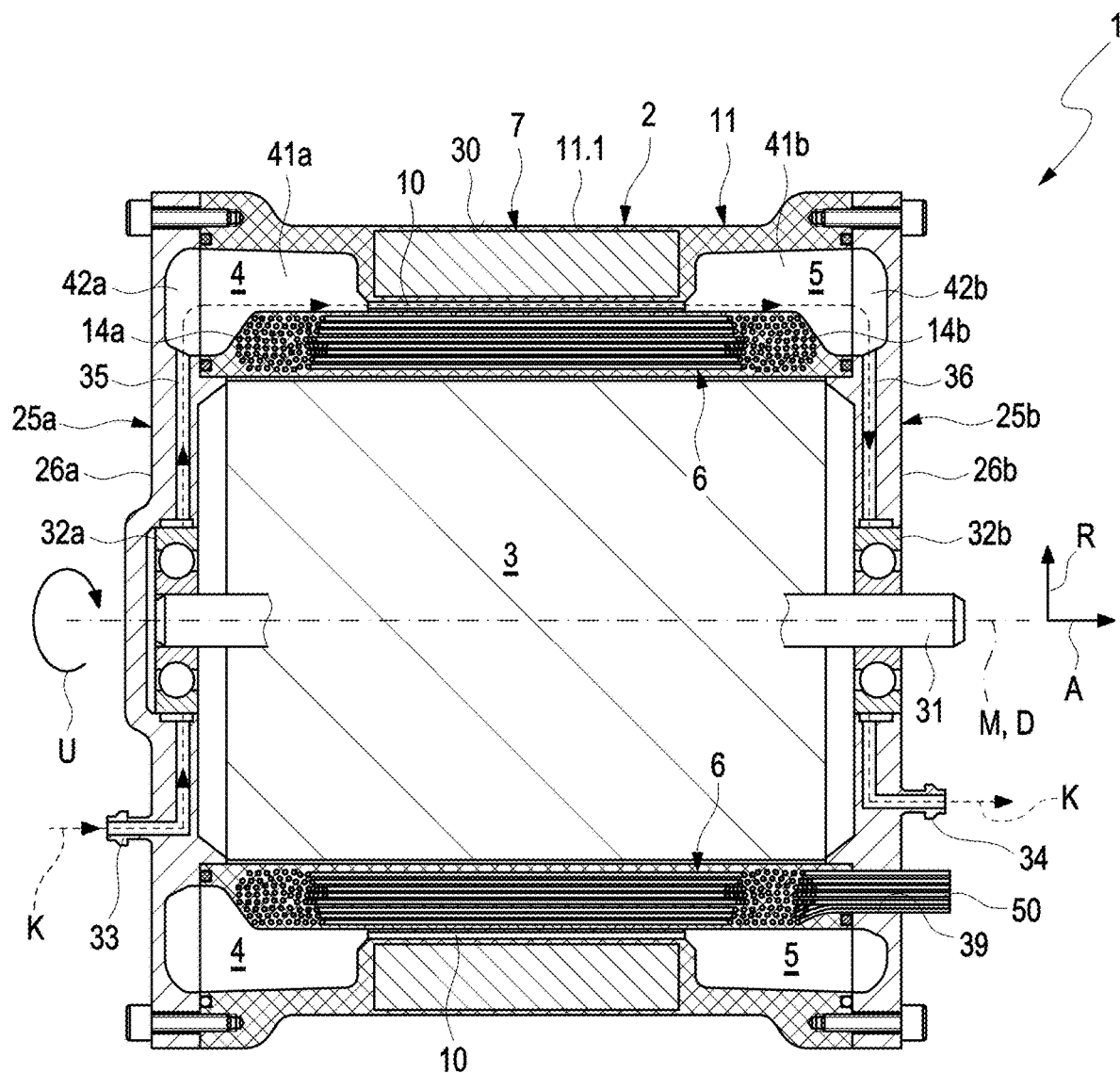
FIG. 4 shows a variant of the electric machine of FIG. 1 in which the coolant flowing through the cooling channels is also used for cooling the shaft bearings of the rotor.

FIG. 4 shows a variant of the example of FIG. 1 in the longitudinal section along the axis of rotation D of the rotor 3. In order to also cool the rotor shaft 31 and the two shaft bearings 32a, 32b during the operation of the machine 1, the coolant feed line 35 may be thermally coupled to the first shaft bearing 32a arranged in the first bearing bracket 25a. Likewise, the coolant discharge line 36 may be thermally coupled to the second shaft bearing 32b arranged in the second bearing bracket 25b. A separate cooling device for cooling the shaft bearings 32a, 32b can be omitted in this way, which results in cost advantages. In the example of FIG. 4, the coolant inlet 33 and the coolant outlet 34 are provided on the outer end side 26a and 26b respectively of the first and second bearing brackets 25a, 25b respectively. In the variant as per FIGS. 4 and 1, the stator windings 6 are arranged radially within the cooling channels 10 with respect to the radial direction R. The stator windings 6 are led with an electrical terminal 50 out of the stator 2 to the outside through a leadthrough 39 provided in the second bearing bracket 25b, such that said stator windings can be electrically energized from the outside. The leadthrough 39 is arranged, with respect to the radial direction R, between the coolant distributor chamber 4 or the coolant collector chamber 5 and the axis of rotation D.

FIG. 5 shows a refinement of the example of FIG. 3. The refinement of FIG. 5 differs from the example of FIG. 3 in that, in the intermediate space 9, a cooling channel 10 is provided not only radially to the outside but additionally also radially to the inside, which cooling channel may, as in the example of FIG. 3, be formed as a tubular body 16 or as a flat tube 17. In the example, the radially inner cooling channel 10 is illustrated as a flat tube 17 with two partition elements 18 and three partial cooling channels 19. The above explanations relating to the example of FIG. 3 also apply mutatis mutandis, where expedient, to the example of FIG. 5.

Attention shall now be directed to the illustration of FIG. 6, which shows, in a detail illustration, an intermediate space 9 formed between two stator teeth 8—hereinafter also referred to as stator teeth 8a, 8b—which are adjacent in the circumferential direction U. To improve the heat transfer of the waste heat generated by the stator windings 6 to the coolant K flowing through the cooling channels 10, a plastics compound 11 composed of a plastic is provided in each case in the intermediate spaces 9, correspondingly to FIG. 6. The cooling channel 10 arranged in the intermediate space 9 and the stator winding(s) 6 arranged in the same intermediate space 9 are embedded into the plastics compound 11, which may for example be composed of a thermoset or may comprise a thermoset. In the example of FIG. 6, a plastics compound 11 composed of a single plastics material is provided in the intermediate space 9.

It is self-evident that the stator winding 6 arranged in the intermediate space 9 as per FIG. 6 belongs in each case partially to a first stator winding 6a, which is borne by a first stator tooth 8a, and is partially assigned to a second stator winding 6b, which is borne by a second stator tooth 8b which is adjacent to the first stator tooth 8a in the circumferential direction U. To illustrate this scenario, one possible virtual parting line 12 is shown in FIG. 6—analogously to FIG. 3. The winding wires 13a shown to the left of the parting line 12 in FIG. 6 belong to the stator winding 6a borne on the stator tooth 8a. The winding wires 13b shown to the right of the parting line 12 consequently belong to the stator winding 6b borne by the second stator tooth 8b.

In the example of FIG. 6, the cooling channel 10 formed in a respective intermediate space 9 is realized by means of multiple apertures 40 which are provided in the plastics compound 11 and which can be flowed through by the coolant K. The apertures 40—four such apertures 40 are shown merely by way of example in FIG. 6—are arranged spaced apart from one another along the circumferential direction U and extend in each case along the axial direction A. The apertures 40 may be realized as passage bores that are formed into the plastics compound 11 by means of a suitable drilling tool. The apertures 40 may, in the cross section perpendicular to the axis of rotation D, have in each case the geometry of a rectangle with two wide sides 20 and with two narrow sides 21. A length of the two wide sides 20 amounts in this case to at least two times, preferably at least four times, a length of the two narrow sides 21. The advantageous geometry of a flat tube is thus replicated.

As can also be seen from the detail illustration of FIG. 6, an electrical insulator 15 composed of an electrically insulating material is arranged in the respective intermediate space 9 between the plastics compound 11 and the stator body 7 or the two stator teeth 8 that delimit the intermediate space 9 in the circumferential direction U. In this way, in the event of the plastics compound 11 rupturing owing to thermal overloading or being damaged in some other way, an undesired electrical short circuit of the respective stator winding 6 with the material of the stator body 7 or of the stator teeth 8—typically iron or some other electrically conductive material—can be avoided. An electrical insulator 15 composed of paper has proven to be particularly inexpensive.

In the example of FIG. 6, the apertures 40 that form the cooling channel 10 are, with respect to the radial direction R, arranged radially outside the stator windings 6 in the plastics compound 11. The radial spacing of the cooling channel 10 to the axis of rotation D of the rotor 3 is thus greater than the spacing of the stator winding 6 to the axis of rotation D. In the cross section perpendicular to the axial direction A as shown in FIG. 6, the two wide sides 20 of the apertures 40 extend in each case perpendicular to the radial direction R.

Figure 7:
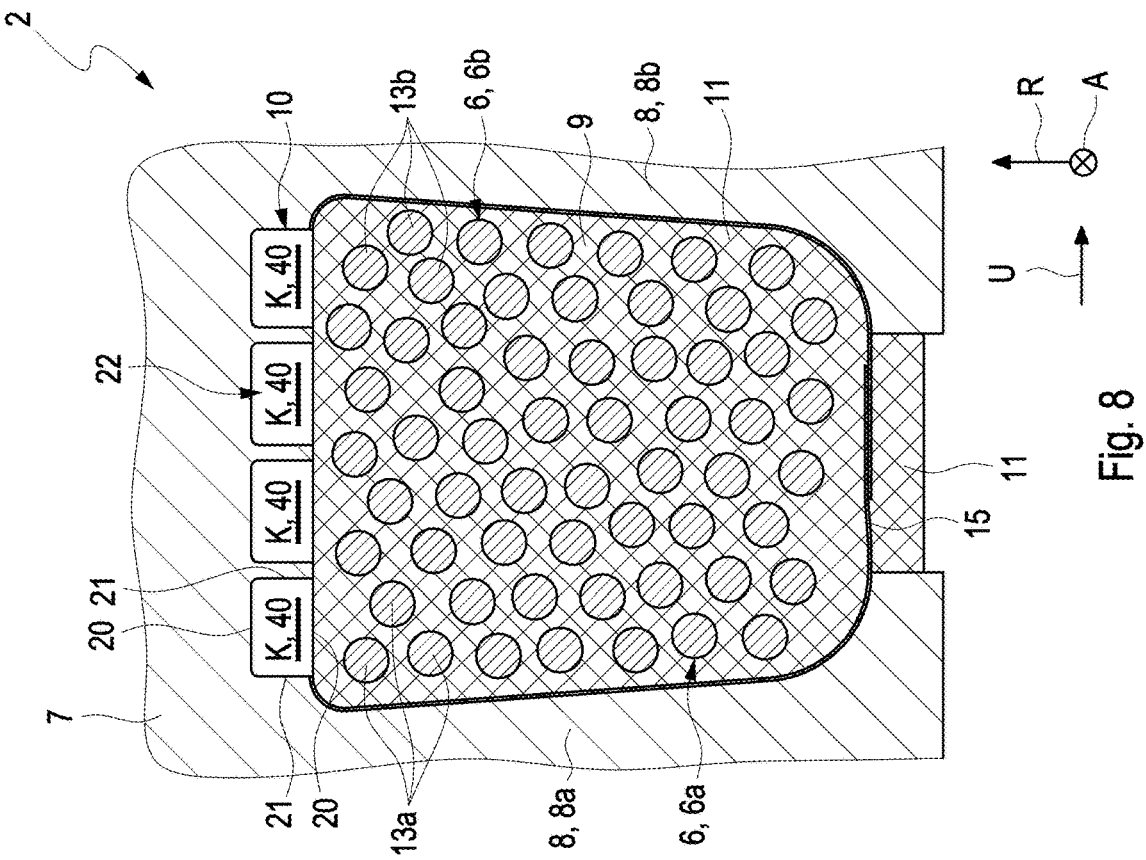

FIG. 7 shows a variant of the example of FIG. 6. In the case of the machine 1 as per FIG. 7, the cooling channel 10 is arranged not in the plastics compound 11 but in the stator body 7 of the stator 2. As can be seen from FIG. 7, the apertures 40 that form the cooling channel 10 are arranged radially outside the intermediate space 9 and, with respect to the circumferential direction U, between two adjacent stator teeth 8a, 8b in the stator body 7. Analogously to the example of FIG. 6, the cooling channel 10 is formed by apertures 40 which are provided in the stator body 7. Thus, during the production of the stator body 7, the cooling channel 10 can be formed by formation of the apertures 40—preferably in the form of bores by means of a suitable drilling tool—into the stator body 7 or into the stator body laminations that form the stator body 7.

Figure 8:
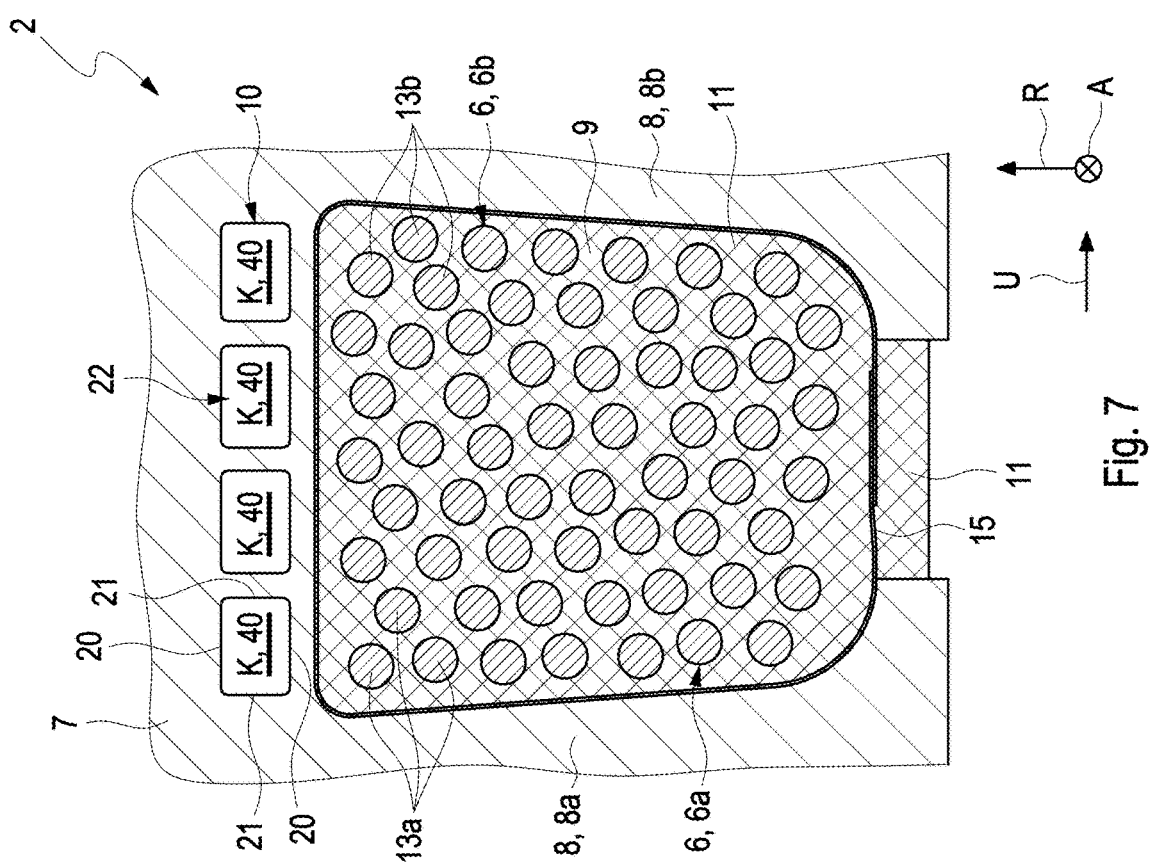

FIG. 8 shows a variant of the example of FIG. 7. It is also the case in the variant as per FIG. 8 that the apertures 40 that form the cooling channel 10 are arranged in the stator body 7 of the stator 2. In the example of FIG. 8, the apertures 40 arranged in the stator body 7 are formed so as to be open toward the intermediate space 9. As can be seen from FIG. 8, the apertures 40 are closed off in fluid-tight fashion toward the intermediate space 9 and by the plastics compound 11 provided in the intermediate space 9.

Figure 9:
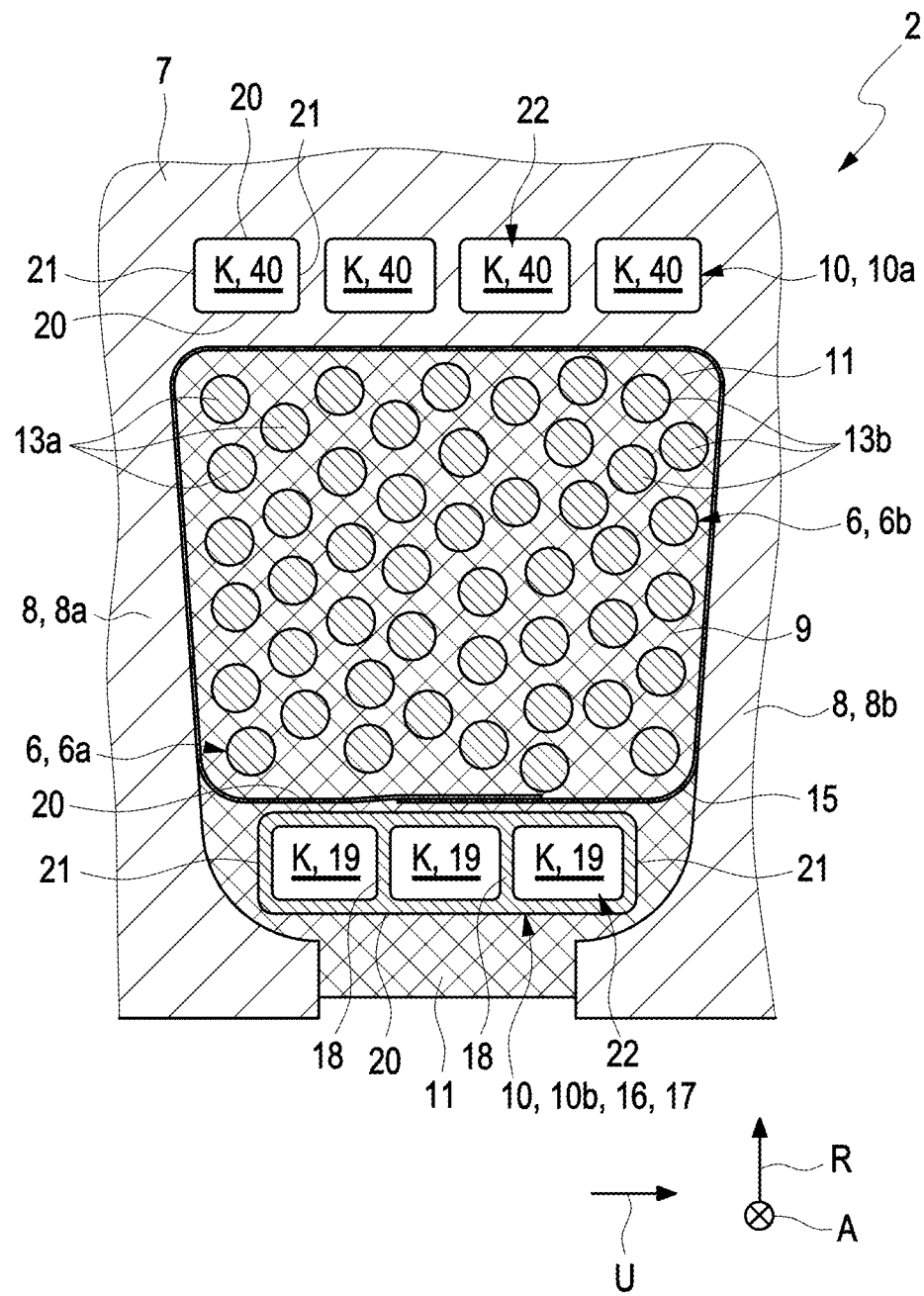

FIG. 9 shows a refinement of the example of FIG. 8. In the case of the machine 1 as per FIG. 9, a cooling channel 10 is provided both in the stator body 7 and in the plastics compound 11. The cooling channel 10 provided in the stator body 7—hereinafter also referred to as "radially outer cooling channel" 10a—is formed analogously to the example of FIG. 8, such that reference is made to the above explanations relating to FIG. 8. The cooling channel 10 arranged in the plastics compound 11 will hereafter also be referred to as "radially inner cooling channel" 10b. The stator winding 6 is thus arranged, with respect to the radial direction R, between the two cooling channels 10a, 10b. As shown in the detail illustration of FIG. 9, the radially outer cooling channel 10b may be formed by a tubular body 16, composed for example of aluminum, which surrounds a tubular body interior space 22. It is optionally possible, as shown in the detail illustration of FIG. 9, for one or more partition elements 18 to be formed on the tubular body 16, which partition elements divide the cooling channel 10 into partial cooling channels 19 which are fluidically separate from one another. In this way, the flow characteristics of the coolant K in the cooling channel 10 can be improved, which is associated with improved heat transfer to the coolant. Furthermore, the tubular body 16 is additionally mechanically stiffened. In the example of FIG. 9, two such partition elements 18 are illustrated by way of example, resulting in three partial cooling channels 19. A different number of partition elements 18 is self-evidently also possible in variants of the example. The tubular body 16 may be formed as a flat tube 17 which, in the cross section perpendicular to the axial direction A, has two wide sides 20 and two narrow sides 21. In this case, a length of the two wide sides 20 amounts to at least four times, preferably at least 10 times, a length of the two narrow sides 21. The wide sides 20 extend perpendicular to the radial direction R.

The variants as per FIGS. 3 to 9 discussed above may be combined with one another where expedient.

The plastics compound 11 may also surround that winding portion of the stator winding 6 which projects axially out of the intermediate space 9 of the stator body, and in so doing partially delimit the coolant distributor chamber 4 and the coolant collector chamber 5 respectively, such that the respective stator winding 6 or the respective winding portion of the stator winding 6 is electrically insulated with respect to the coolant when the latter flows through the respective cooling channel 10 during the operation of the machine 1.

The coolant distributor chamber 4 and the coolant collector chamber 5 are expediently arranged adjacent to the stator body 7 in an axial elongation of said stator body. The coolant distributor chamber 4 and the coolant collector chamber 5 preferably do not project beyond the stator body 7 or stator 2 along the radial direction R of said stator body or stator.

The stator winding 6 is in each case designed so as to be electrically insulated with respect to the coolant K and with respect to the stator body 7 of the stator 2 at least in the region within the respective intermediate space 9 during the operation of the electric machine 1. An undesired electrical short circuit of the stator winding 6 with the stator body 7—during the operation of the electric machine 1—with the coolant K is prevented in this way. Such electrical insulation of the stator winding 6 with respect to the stator body 7, and preferably also with respect to the stator teeth 8 that delimit the intermediate space 9, is expediently formed entirely by the plastics compound and/or by the additional electrical insulator 15 already mentioned above.

The additional electrical insulator 15 expediently extends within the intermediate space 9 over the entire length, measured along the axial direction A, of the intermediate space 9, such that said additional electrical insulator insulates the stator winding 6 with respect to the stator body 7 and with respect to the stator teeth 8 respectively.

The additional electrical insulator 15 expediently surrounds the stator winding 6 within the intermediate space 9 over at least the entire length of the intermediate space 9 along the circumferential delimitation thereof.

The stator winding 6 is expediently also electrically insulated with respect to the cooling channel formed as tubular body 16. Here, the electrical insulation is formed by the plastics compound and alternatively or additionally by the additional electrical insulator 15.

The invention claimed is:

1. An electric machine, comprising:
   a rotor rotatable about an axis of rotation that defines an axial direction, and a stator including stator windings,
   a coolant distributor chamber and a coolant collector chamber which is arranged with an axial spacing to the coolant distributor chamber, wherein the coolant distributor chamber fluidically communicates with the coolant collector chamber for cooling the stator windings via at least one cooling channel that can be flowed through by a coolant, wherein at least one of the stator windings is embedded into a plastics compound composed of an electrically insulating plastic for thermal coupling,
   wherein at least one of the coolant distributor chamber and the coolant collector chamber is arranged in a region of at least one of a first axial end portion and a second axial end portion of the at least one stator winding,
   wherein the coolant distributor chamber and the coolant collector chamber are, for thermal coupling to the at least one stator winding, at least partially arranged in the plastics compound, wherein the plastics compound extends in the axial direction along the at least one stator winding embedded therein from the first axial end portion to the second axial end portion to at least partially delimit the coolant distributor chamber and the coolant collector chamber, and wherein the plastics compound extends along a radially outside of the coolant distributor chamber and the coolant collector chamber beyond the first axial end portion and the second axial end portion of the at least one stator winding in the axial direction;

wherein at least one of the coolant distributor chamber and the coolant collector chamber has a U-shaped or C-shaped geometrical shape in a longitudinal section along the axial direction;

wherein the stator has stator teeth extending along the axial direction and arranged spaced apart from one another along a circumferential direction of the rotor, wherein the at least one cooling channel and the at least one stator winding are embedded in the plastics compound and arranged in a common intermediate space that is disposed between two stator teeth which are adjacent in the circumferential direction, wherein the common intermediate space comprises a first partial space where the at least one stator winding is arranged, and a second partial space where the at least one cooling channel is arranged, and a positioning aid is arranged between the first and second partial spaces, wherein the positioning aid positions the at least one cooling channel in the second partial space.

2. The electric machine as claimed in claim 1, wherein at least one of the coolant distributor chamber and the coolant collector chamber surrounds the at least one of the first axial end portion and the second axial end portion respectively of the at least one stator winding in U-shaped or C-shaped fashion in a longitudinal section along the axis of rotation.

3. The electric machine as claimed in claim 1, wherein at least one of the coolant distributor chamber and the coolant collector chamber is arranged both radially at an outside and radially at an inside at a respective one of the first axial end portion and the second axial end portion of the at least one stator winding.

4. The electric machine as claimed in claim 1, wherein at least one of the coolant distributor chamber and the coolant collector chamber has a ring-shaped geometrical shape in a cross section perpendicular to the axis of rotation of the rotor.

5. The electric machine as claimed in claim 1, wherein the at least one cooling channel and the at least one stator winding are embedded in the plastics compound, and wherein a portion of the plastics compound is disposed between and separates the at least one cooling channel from the at least one stator winding.

6. The electric machine as claimed in claim 1, wherein at least one of the coolant distributor chamber and the coolant collector chamber is defined by a cavity provided at least partially in the plastics compound.

7. The electric machine as claimed in claim 1, wherein the at least one cooling channel is completely embedded into the plastics compound composed of the electrically insulating plastic and is separated from the at least one stator winding via the plastics compound.

8. The electric machine as claimed in claim 1, wherein:
the positioning aid comprises two projections disposed on the two stator teeth that are adjacent in the circumferential direction, and
the two projections face toward one another in the circumferential direction and project into the common intermediate space beyond circumferential ends of the at least one cooling channel for positioning the at least one cooling channel and providing a radial stop for the at least one cooling channel.

9. The electric machine as claimed in claim 1, wherein an additional electrical insulator extends within the common intermediate space over an entire length, measured along the axial direction, of the common intermediate space, such that said additional electrical insulator insulates the stator windings with respect to the stator and with respect to the stator teeth that delimit the common intermediate space.

10. The electric machine as claimed in claim 9, wherein the at least one stator winding is electrically insulated, by at least one of the plastics compound and the additional electrical insulator, with respect to the at least one cooling channel formed as a tubular body.

11. The electric machine as claimed in claim 1, wherein:
in at least one intermediate space between two stator teeth of the stator, the plastics compound is composed of a single plastic, and
in the at least one intermediate space, there is arranged an additional electrical insulator composed of an electrically insulating material.

12. The electric machine as claimed in claim 8, wherein the additional electrical insulator is arranged between the stator windings and the two stator teeth.

13. The electric machine as claimed in claim 12, wherein the additional electrical insulator surrounds the stator windings within the at least one intermediate space over at least an entire length of the at least one intermediate space along a circumference thereof.

14. The electric machine as claimed in claim 1, wherein at least one of:
the electrically insulating plastic comprises a thermoset, and
the electrically insulating plastic comprises a thermoplastic.

15. The electric machine as claimed in claim 1, wherein the at least one cooling channel is embedded in the plastics compound such that the at least one cooling channel with the plastics compound is provided in at least one intermediate space between two stator teeth arranged adjacent in the circumferential direction.

16. The electric machine as claimed in claim 1, wherein the at least one cooling channel is arranged at least one of radially outside and radially within the respective stator winding in an intermediate space.

17. The electric machine as claimed in claim 1, wherein the at least one cooling channel is a tubular body which surrounds a tubular body interior space,
wherein, on the tubular body, at least one partition element is provided which divides the tubular body interior space into at least two partial cooling channels which are fluidically separate from one another.

18. The electric machine as claimed in claim 17, wherein the tubular body is a flat tube with two wide sides and two narrow sides.

19. The electric machine as claimed in claim 17, wherein the tubular body is a flat tube, wherein, in a cross section perpendicular to the axial direction, at least one wide side of the flat tube extends substantially perpendicular to a radial direction.

20. The electric machine as claimed in claim 1, wherein the at least one cooling channel is arranged entirely in the plastics compound.

21. The electric machine as claimed in claim 1, wherein:
the stator comprises a ring-shaped stator body,
stator teeth which extend along the axial direction and which are arranged spaced apart from one another along a circumferential direction and bear the stator windings project from the stator body, wherein at least one plastics compound with the at least one cooling channel and with the at least one stator winding is arranged in an intermediate space disposed between two stator teeth that are adjacent in the circumferential direction.

22. The electric machine as claimed in claim 1, wherein the at least one cooling channel is defined by at least one aperture provided in the plastics compound and can be flowed through by the coolant.

23. The electric machine as claimed in claim 22, wherein the at least one aperture has, in a cross section perpendicular to the axial direction, a geometry of a rectangle with two wide sides and two narrow sides.

24. The electric machine as claimed in claim 21, wherein the at least one cooling channel is arranged in the stator body radially outside of an intermediate space containing the stator windings and the plastics compound, and wherein the at least one cooling channel is defined by at least one aperture which can be flowed through by the coolant.

25. The electric machine as claimed in claim 24, wherein the at least one aperture is open toward the intermediate space and is closed off in fluid-tight fashion by the plastics compound arranged in the intermediate space.

26. The electric machine as claimed in claim 21, wherein the at least one cooling channel is provided in the plastics compound and at least one further cooling channel is provided in the stator body.

27. The electric machine as claimed in claim 1, wherein:
the stator is arranged along the axial direction between a first bearing bracket and a second bearing bracket disposed axially opposite one another,
wherein at least one of a part of the coolant distributor chamber is arranged in the first bearing bracket and a part of the coolant collector chamber is arranged in the second bearing bracket, and
wherein the first and second bearing brackets are provided as separate components which at least partially delimit the coolant distributor chamber and the coolant collector chamber respectively.

28. The electric machine as claimed in claim 27, wherein:
a coolant feed line is provided in the first bearing bracket, and fluidically connects the coolant distributor chamber to a coolant inlet that is provided at a face side on the first bearing bracket,
wherein the coolant feed line is thermally connected to a first shaft bearing, which is provided in the first bearing bracket, for a rotatable mounting of the rotor,
a coolant discharge line is provided in the second bearing bracket, and fluidically connects the coolant collector chamber to a coolant outlet that is provided at a face side on the second bearing bracket, and
wherein the coolant discharge line is thermally connected to a second shaft bearing, which is provided in the second bearing bracket, for the rotatable mounting of the rotor.

29. The electric machine as claimed in claim 1, wherein at least one of:
the plastics compound is an injection-molded compound composed of the electrically insulating plastic; and
the plastics compound is formed as a single piece.

30. The electric machine as claimed in claim 1, wherein the at least one stator winding is arranged in an intermediate space formed between two stator teeth, and wherein the plastics compound surrounds and separates individual winding wires of the at least one stator winding at least in the intermediate space.

31. The electric machine as claimed in claim 30, wherein the plastics compound at least partially surrounds at least one winding portion, which projects axially out of the intermediate space, of the stator windings and partially delimits at least one of the coolant distributor chamber and the coolant collector chamber, such that said at least one winding portion is electrically insulated with respect to the coolant during operation.

32. The electric machine as claimed in claim 1, wherein the at least one cooling channel comprises a plurality of cooling channels such that the coolant distributor chamber fluidically communicates with the coolant collector chamber via the plurality of cooling channels, and wherein the plurality of cooling channels are embedded in the plastics compound and separated from the at least one stator winding via the plastics compound.

33. The electric machine as claimed in claim 32, wherein the plurality of cooling channels extend spaced apart from one another along the axial direction.

34. The electric machine as claimed in claim 32, wherein the plurality of cooling channels are arranged spaced apart from one another along a circumferential direction of the stator.

35. The electric machine as claimed in claim 1, wherein at least one of the coolant distributor chamber and the coolant collector chamber is arranged adjacent to the stator exclusively in an axial elongation of the stator.

36. The electric machine as claimed in claim 1, wherein at least one stator winding is configured electrically insulated with respect to the coolant and with respect to the stator at least in a region within an intermediate space between two stator teeth of the stator during operation.

37. The electric machine as claimed in claim 36, wherein the electrical insulation of the at least one stator winding with respect to the stator is provided entirely by at least one of the plastics compound and an additional electrical insulator.

38. The electric machine as claimed in claim 1, wherein:
the stator comprises a ring-shaped stator body,
the plastics compound composed of the electrically insulating plastic is arranged on an outer circumferential side of the stator body and provides an outer coating on said outer circumferential side.

39. The electric machine as claimed in claim 1, wherein the stator windings are part of a distributed winding.

40. A vehicle, comprising:
at least one electric machine, the at least one electric machine including:
a rotor rotatable about an axis of rotation that defines an axial direction, and a stator including stator windings;
a coolant distributor chamber and a coolant collector chamber which is arranged with an axial spacing to the coolant distributor chamber, wherein the coolant distributor chamber fluidically communicates with the coolant collector chamber for cooling the stator windings via at least one cooling channel that can be flowed through by a coolant, wherein at least one of the stator windings is embedded into a plastics compound composed of an electrically insulating plastic for thermal coupling;
wherein at least one of the coolant distributor chamber and the coolant collector chamber is arranged in a region of at least one of a first axial end portion and a second axial end portion of the at least one stator winding;

wherein the coolant distributor chamber and the coolant collector chamber are, for thermal coupling to the at least one stator winding, at least partially arranged in the plastics compound, wherein the plastics compound extends in the axial direction along the at least one stator winding embedded therein from the first axial end portion to the second axial end portion to at least partially delimit the coolant distributor chamber and the coolant collector chamber, and wherein the plastics compound extends along a radially outside of the coolant distributor chamber and the coolant collector chamber beyond the first axial end portion and the second axial end portion of the at least one stator winding in the axial direction;

wherein at least one of the coolant distributor chamber and the coolant collector chamber has a U-shaped or C-shaped geometrical shape in a longitudinal section along the axial direction;

wherein the at least one cooling channel is embedded in the plastics compound and separated from the at least one stator winding via the plastics compound;

wherein the stator has stator teeth extending along the axial direction and arranged spaced apart from one another along a circumferential direction of the rotor, wherein the at least one cooling channel and the at least one stator winding are embedded in the plastics compound and arranged in a common intermediate space that is disposed between two stator teeth which are adjacent in the circumferential direction, wherein the common intermediate space comprises a first partial space where the at least one stator winding is arranged, and a second partial space where the at least one cooling channel is arranged, and a positioning aid is arranged between the first and second partial spaces, wherein the positioning aid positions the at least one cooling channel in the second partial space.

* * * * *